Dec. 12, 1961 C. H. SCHAAR 3,012,659
HEAT-SEALED POLYETHYLENE TEREPHTHALATE PACKAGE
Filed Jan. 3, 1956 2 Sheets-Sheet 1
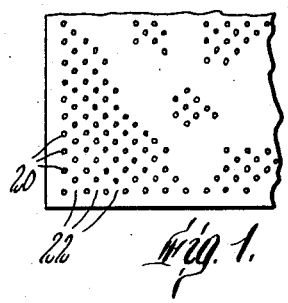
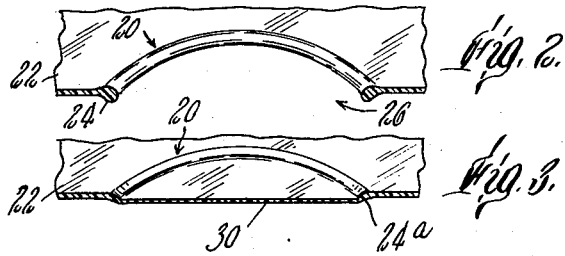
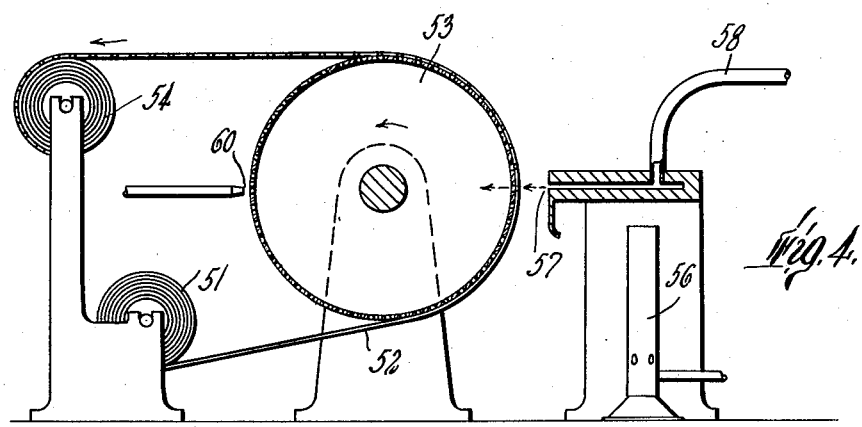
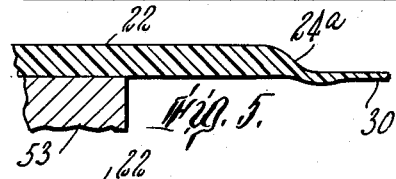
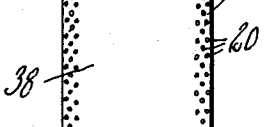
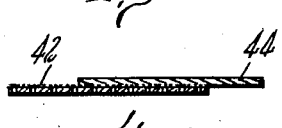
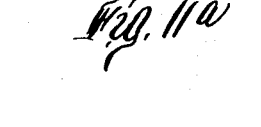

United States Patent Office 3,012,659
Patented Dec. 12, 1961

3,012,659
HEAT-SEALED POLYETHYLENE TEREPHTHALATE PACKAGES
Charles H. Schaar, Chicago, Ill., assignor to The Kendall Company, Boston, Mass., a corporation of Massachusetts
Filed Jan. 3, 1956, Ser. No. 557,103
3 Claims. (Cl. 206—46)

This invention relates to polymeric sheet materials and more particularly to the preparation of polymeric sheet materials paradoxically having improved sealability characteristics on at least one surface thereof despite the fact that the sheet materials are constituted essentially of polymeric material which per se, in sheet form, has inferior, or is wholly lacking in, sealable qualities, though it possesses many other serviceable attributes for general sheeting use.

Lacking of sealability, or sealability involving intricate sealing techniques, in any polymeric sheet material is a notorious drawback to its general utility. By virtue of the present invention, this drawback can be removed, sealability imparted or improved, and greater utility attained.

Polymeric materials herein referred to as non-sealable in sheet form are those polymeric materials whose softening or sticking point temperature in sheet form is so close to the distortion point temperature of the sheet, or whose reaction in sheet form to application of tack-producing solvents in such, that, as a practical matter, it is impossible to develop sufficient stickness in any areas of a surface of the sheet to cause it adherence to a similar sheet, or to other materials, without simultaneously detrimentally distorting or uncontrollably rupturing the sheet as a whole, or altering its visual appearance, thereby impairing its commercial utility, if not destroying it completely.

An illustrative example of such non-sealable sheet material is the line of products now sold commercially by E. I. du Pont de Nemours & Company under the trade name Mylar, being films comprised essentially of polyethylene terephthalate. For convenience this material will herein after be referred to as Mylar. In its present day commercial form, in sheet calipers running from ¼ mil to 7 mils, Mylar has a very sharp published melting or distortion point temperature at about 250° C. Its surface softening or sticking point temperature is only a few degrees (about 5°) below 250° C. so that application of sufficient heat to cause stickiness to develop at the softening point temperature normally results in such close approach to the distortion temperature as to cause the aforementioned effects. Similarly available solvents cannot develop sufficient stickiness in Mylar for sealability without also causing similar detrimental effects. These adverse effects increase with increasing thinness of the sheets. Conventional heat-sealing or solvent-sealing operations have no utility when applied to Mylar film.

It is hence a primary object of this invention to produce a mechanically satisfactory heat-sealable sheet material constituted essentially of Mylar polymer or of other polymeric materials having similarly sharp melting points and like Mylar, being non-heat sealable as hereinbefore defined.

As a further incident of the invention, the sheet material hereof may have solvent-sealable properties as well as heat-sealable properties, although the simplicity of heat-sealing will, by and large, lead one to ignore the solvent-sealing capacity of the sheet.

In general, the primary object of the invention is accomplished by producing a sheet material having potential or improved heat- or solvent-sealability in certain selected surface areas thereof, supported and usually surrounded by remaining surface areas of the sheet which are in a less readily sealable state. In this way, desirable characteristics of the remaining areas, such as good heat resistance, solvent-resistance, high tensile strength, abrasion resistance, etc. are present without being sacrificed or impaired for the sole purpose of imparting sealability to the sheet, while, in the selected areas, they can or may be so sacrificed, at least temporarily.

These selected areas are constituted of the material of the sheet per se and are not constituted of separately applied coatings or laminae. Nevertheless, the selected areas have satisfactory sealing characteristics, in contrast to the remainder of the sheet.

While the selection of the location of the different areas may follow a large variety of patterns, highly useful patterns comprise those wherein the localized areas are minute and only minutely separated from one another. With such patterns, the sealing, while partaking of the nature of spot welding, occurs at such closely spaced intervals as to create as effective seal over the entire area, sufficient in most cases to qualify as an effectively imprevious and hermetic seal, suitable for food, pharmaceutical, surgical and other packaging.

The localized areas may also take a variety of geometric shapes—polygonal, circular, elliptical, and/or combinations thereof. They may be intermixed in heterogeneous patterns for decorative or other purposes. An included portion of the sheet within the localized area may be a void piercing the sheet and rendering the sheet perforate, both before and after sealing lamination to other materials. In the case of a pierced circular area, the heat sealing area takes the form of an annular surface area surrounding the perforation. The patterns may also be varied by varying the size and spacing of the areas, as well as their shapes.

Sheet material and sealed laminates made therefrom in accordance with this invention may be more fully understood when taken in connection with the following description of specific embodiments of the invention shown in the accompanying drawings in which:

FIG. 1 is a plan view showing schematically a sheet material of the invention; and FIG. 2 is a highly enlarged detailed cross-sectional schematic perspective view of a portion of the sheet shown in FIG. 1; and FIG. 3 is a similarly enlarged detailed cross-sectional schematic perspective view of a modified form of sheet material of this invention; and FIG. 4 is a diagrammatic representation of one form of apparatus useful in making the sheet materials of FIGS. 2 and 3; and FIGS. 5–9 are greatly enlarged cross-sectional depictions of the nature of various forms of heat-sealable areas in sheets of this invention; and FIG. 10 is a representation of a sheet of this invention heat-sealed to another lamina; and FIG. 11 is a representation of two sheets of this invention heat-sealed to one another with their perforations in register; and FIG. 11a is a representation in cross-section of a sheet of this invention heat-sealed to another lamina with an intervening lamina; and FIG. 12 is a representation of a certain pattern of perforations useful for packaging purposes; and FIG. 13 is a side elevational view of a package formed with the use of 2 layers of the material of FIG. 12; and FIG. 14 is a view similar to that of FIG. 13 showing a modified form of package; and FIG. 15 is a photomicrograph showing in cross-section the edge of a perforation in a 1 mil Mylar sheet of this invention; and FIG. 16 is a photomicrograph of one of the areas depicted in part in FIG. 3; and FIG. 17 is a photomicrograph of one of the areas depicted in part in FIG. 6; and FIG. 18 is a photomicrograph showing in side by side comparison 2 perforated ¼ mil sheets of this invention, one before and one after an optional conditioning treatment, both viewed through one of two crossed polarizing elements between which the sheets are placed.

FIG. 1 represents a sheet of this invention, for example composed of polyethylene terephthalate, the entire surface area of which displays a series of localized surface areas 20 which have different physical characteristics from those of the intervening areas 22 constituting the matrix of the sheet. In the form of the invention shown by the detail in FIG. 2, each of these localized areas is toroidal in shape and somewhat thicker than the matrix and has the appearance of a bead 24 encircling a perforation 26 through the sheet.

These beads 24 serve the double purpose of reinforcing the edges of the perforations and of providing areas having heat and/or solvent sealing characteristics. In their reinforcing function, they may be aptly regarded as grommets.

In the detail of FIG. 3, the structure is modified to the extent that, while the bead 24a is largely present, it encircles, instead of a perforation, a connecting film or membrane 30 of material having a reduced thickness. In these cases, the membrane may have thermal characteristics more clearly conforming to those of the bead material 24a than to those of the remaining portions 22 of the sheet.

The perforations (or the membranes) may be extremely minute. For example, the film of FIGS. 1 and 2, having for example a ¼ mil caliper in the areas 22 may contain perforations slightly less than 20 mils in minimum diameter, and so closely spaced as to provide 714 holes or more per square incnh. Similar dimension may be present where, as in FIG. 3, there is no perforation.

Normally, the beads 24 and 24a are constituted wholly or in some part of material displaced into the bead from an area within the bead. Accordingly, the larger the perforation, the larger the volume of the bead. This explains the structure shown in FIG. 3 wherein insufficient amounts of the material of the original sheet within the area of the bead has been displaced to puncture the sheet and, in this case, the beads are therefore formed by displacement of only a part of the intervening material, leaving the remainder 30 in as a thin spanning membrane.

It can thus be seen that, as an extreme, the portion of the sheet within the bead areas may constitute substantially the entire surface area of the sheet, particularly if the perforations or membranes and/or their surrounding beaded areas are of hexagonal or other suitable shape so as to interfit with every adjacent beaded area. For optimum mechanical properties, it is much preferred to leave a continuous surface matrix 22 between the beaded areas.

The heat-sealability characteristics in the beads 24 (FIG. 2) or within the beaded area 20 (FIG. 3) can be imparted concomitant to the formation of the beads (or beaded areas) by forming the beads as a consequence of a precisely localized melting of selected areas of a Mylar film followed by quick solidification thereof.

In a true sense then, the production of localized sealable areas on a Mylar sheet is the result of a heat-conditioning treatment precisely applied only in pre-selected localized areas of the sheet, without subjecting the intervening areas of the sheet to the same treatment, so that the intervening areas are not similarly affected. Such visible change in the appearance of the sheet as occurs does not destroy its utility. On the contrary, such distortion and/or puncture as occurs in the treated area has definite commercial advantage by way of producing a sheet having desirable design patterns, without loss of the stability and integrity of the sheet as a whole which are maintained by the continuous matrix, including the desirable solvent-resistant, heat resistant, and other qualities of the matrix areas of the sheet. In this connection, the formation of a bead is of decided advantage in forming reinforcing areas about the weakened or lost structure, thus increasing the tear resistance of the sheet, even when compared to the tear resistance of Mylar film.

In any event, precisely localized melting and immediate cooling of pre-selected areas of sheet material such as Mylar causes the material within the resulting beaded areas 20 to acquire surface softening or sticking point temperatures far below that of the remaining areas 22. For example, in the case of commercial Mylar having a published melting point temperature of 250 to 252° C., and incapable of being heat-sealed to itself at any temperature less than 245° C., I have found that the softening point temperature of the surfaces of the localized heat conditioned areas 20, as measured by their ability to be heat-sealed when placed in face-to-face contact without externally applied pressure is about only 120° C. With pressure, self-sealing has been accomplished at temperatures as low as 107° C.

Thus, by the application of sealing heats to raise the temperature of the treated film in areas to be sealed to 120° C. or more, but still short of 245° C., for example, anywhere within the range of 120° C. to 240° C., practical heat-sealing of the film to itself can be accomplished, with or without registration of the areas 20 as shown in FIG. 11, or to untreated Mylar film or to any of a variety of other materials such as paper, fibrous fabrics, woven, knitted, felted or molded, non-fibrous materials including metal foils, glass, other films, as represented by 32 in FIG. 10 without distortion or melting of the remainder of the sheet i.e., matrix 22, which maintains the general stability and integrity of the sheet as a whole, i.e., without substantial shrinkage. Such sealing can be readily performed by conventional heat-sealing equipment.

FIG. 12 is a view of a sheet of this invention, wherein the heat-sealable areas 20 are confined to certain portions of the sheet only, including the borders and certain spaced transverse areas, the central areas 38 being imperforate. Such a material is useful in forming packages of the type shown in FIG. 13 wherein two of the sheets of FIG. 12 are fed in register to conventional packaging machines, which insert material 40 to be packaged between the two sheets during or after which the two sheets are heat-sealed to each other around the borders to enclose the packaged article, which may take any form—solid, granular or even liquid where the beaded areas interfit sufficiently to form a liquid-tight seal. Subsequently, the strip of packages can be severed medially of the transverse heat-sealed areas to provide individual packaged units or measures.

FIG. 14 shows a similar package, which is made from material similar to that of FIG. 12 with the exception that in the case of FIG. 14, both sheets are perforated throughout their entire surfaces so that the finished package is perforated throughout and hence is useful for infusion purposes and may contain food such as tea or coffee. In fact, because of the high melting point of Mylar, materials contained in a package such as that of FIG. 14 may be boiled in the package and thereafter even served in the package. Since this boiling will raise the temperature of the package only to 100° C. this temperature will not affect either the Mylar or the heat-sealed areas.

The melting of the material within the bead areas may be accomplished either by conduction, convection or radiation of heat or combinations thereof. One may utilize hot dies or hot needles. While the latter puncture the film, their essential action is to melt the material which they contact. Precise localization of treatment may be obtained by transfer of heat from a heated fluid, preferably gaseous, while controlling the absorption of heat from the fluid by the sheet so that certain areas of the sheet rise above the melting point of the material thereof, while the material in the intervening areas remains unmelted. Such control may take the form of more rapidly conducting the absorbed heat away from certain areas of the sheet than from other areas, as by the use of a cooled grid over which the sheet is supported during the application of the heat. Such a grid may conveniently be an engraved cylinder or a fine screen or perforated cylindrical plate of the type used in the pulp industry for increasing the fiber concentration in fiber containing solutions.

One form of apparatus which may be successfully used in the preparation of sheets of this invention is shown in FIG. 4 of the drawings. The apparatus includes a reel of film material 51 from which the material 52 is fed, usually in single layer form, over a rotating metal drum 53, the surface of which is provided with perforations of the desired dimension and pattern and the film 52 then passes to a takeup roll 54. Opposite the drum there is provided means for directing a jet of heated air onto the surface of the film 52 passing over the drum 53. The jet is so formed that it may be efficiently heated as by a gas flame from a burner 56. The air is directed through the jet orifice 57 under pressure supplied from the pipe 58.

In the case of ¼ mil Mylar film, the jet orifice was 25 mils wide and 9 inches long, the air pressure was about 30 pounds, the drum 53 was approximately 4 inches in diameter and in one case, for example, contained about 237 holes per square inch on uniformly spaced centers affording an open area of approximately 21% with each hole being approximately 33 mils in diameter.

The temperature of the air as it issued from the jet was approximately 370° C. At this temperature, the film 52 was fed through the apparatus at approximately 7 yards per minute, the space between the orifice and the grid roll being approximately ¼ inch (shown enlarged in FIG. 4).

A cooling jet 60 is directed against the back surface of the drum 53 and is operated to maintain the surface of the drum preferably at approximately 55 to 70° C.

FIGS. 5 to 9 are intended as graphic successive representations, in cross-section, of the development of the perforations in a ¼ mil Mylar sheet during the treatment in the aforementioned apparatus.

At an early stage of melting of the sheet material in areas where it lies over grid perforations, there appears to be thinning with usually a rapid development of blistering in the thinned areas so that the sheet has a thinned and somewhat porous membrane 30 extending over each grid void. If the rate of feed through the apparatus is so fast that the thermal effect does not proceed beyond that shown in FIG. 5, one secures finished sheet material on the take-up reel 54 having the characteristics of that shown in FIG. 3.

FIGS. 6 through 9, inclusive, represent the successive effects of longer application of heat to the material overlying the grid voids. This series of figures shows, first the rupture of the material centrally followed by a progressive displacement of the material towards the unmelted areas surrounding the perforation and taking in general the successive forms of bead-like borders, culminating in the bead 24 depicted in FIG. 9.

Figure 15:
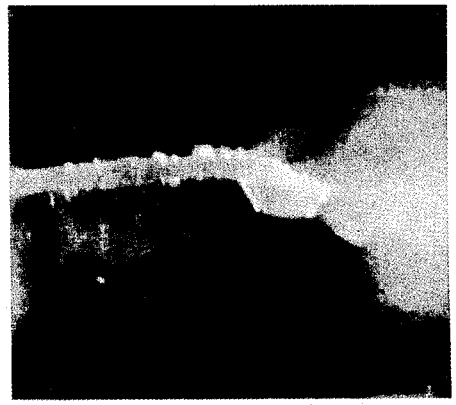
FIG. 15 is a photomicrograph of an edge of a perforation in 1 mil Mylar film, showing the bead 24 in cross-section as depicted in FIG. 9.
Figure 16:
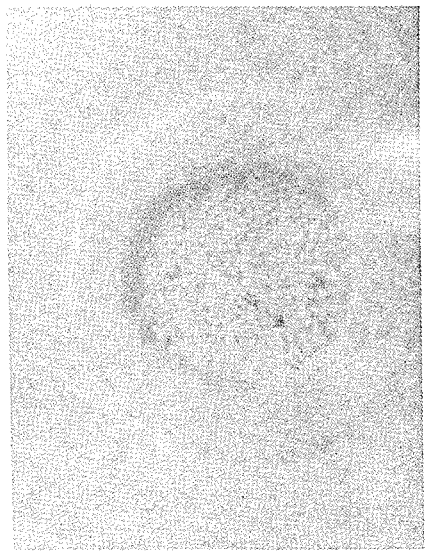
FIG. 16 shows the photomicrograph appearance in plan of the top of a sheet which has been treated to the stage shown in FIGS. 3 and 5.
Figure 17:
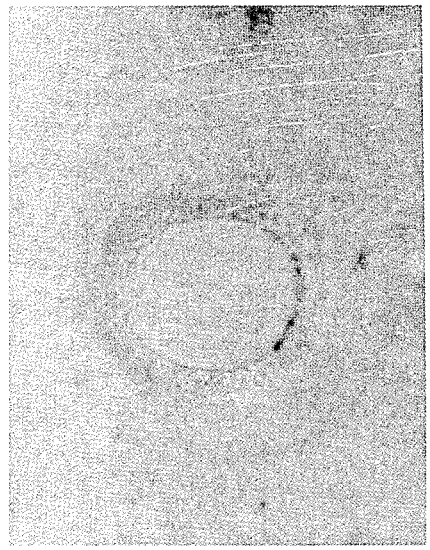
FIG. 17 shows in a similar manner a sheet at a later stage of thermal treatment wherein the perforation has occurred and the blistered material is at a certain stage of retraction towards the surrounding sheet, as in FIG. 6.

As shown in FIG. 11a, a sheet of this invention 22 may be provided with a thin metallic layer 42 of aluminum or other metal which may be painted on one or both sides thereof or coated thereon as by a metal vacuum deposition process, thus giving one or both surfaces a light and heat reflectant quality and rendering the material useful for heat insulation purposes. Alternatively, the layer 42 may be formed of a pigment, painted or otherwise coated onto the Mylar film. If such a pigmented or metallized Mylar sheet is fed through the apparatus of FIG. 4, under conditions normally producing beaded perforation, the metal or pigmented coating, whether on the grid or jet side or both sides, although it may not be melted, is ruptured in areas overlying the grid voids because of the velocity of the jet, or of disruption attendant to the melting of the underlying Mylar. Either surface of the resulting material can be heat-sealed at 120° C. temperature or more, the disruption of the metal or pigmented coating appearing to be sufficient to expose the beaded areas to materials pressed even against the previously coated surface, whether those materials be fibrous in nature or not. Thus FIG. 11a shows a composite comprising a bottom perforated Mylar sheet and intervening metallized or pigmented coating 42 on the Mylar sheet and an overlying lamina 44 of any material which may or may not be transparent.

If the metallized film is fed to the apparatus with the pigmented or metallized surface on the grid side only, the jet side of the sheet may alternatively be rendered heat-sealable by forming heat-sealable areas of the type shown in FIG. 3, without necessarily disrupting the metallized or pigmented surface. Alternatively, the metal may be fed as a very thin foil together with the Mylar to the apparatus of FIG. 4. Of course, the treated polyethylene terephthalate material may be metallized on at least one side after treatment.

While for the purposes of this patent, I do not regard it as essential to explain the phenomena involved, it seems safe to say that the lowered surface softening point temperature of the beaded areas is chiefly a consequence of a change in the physical, rather than the chemical, structure of these areas. Such a change might be one of either the state of crystallinity or of molecular orientation of the polymer of which the film is constituted, or both. Such a change in molecular physical structure is consistent with the shrinkage and structural disintegration of Mylar film when it is heated to temperatures of about 245° C. (just below its melting point temperature). This hypothesis also appears to be consistent with the processing steps of stretch orientation and thermally or solvent induced crystallization believed to be used in the manufacture of Mylar film, subsequent to its initial extrusion from a melt.

The surprisingly low softening temperatures (circa 120° C.) of the selected sealable areas 20 of the films of this invention, thus appear to be a property of a polyethylene terephthalate polymer characterized by a loss of all or a substantial portion of the crystallinity and/or orientation commonly observed in the ordinary samples of this polymer, e.g. Mylar film. Therefore, it is likely that the localized heat-treatment heretofore described actually involves a melting of localized areas of Mylar material and in so doing destroys most if not all of the molecular orientation and crystallinity present in the Mylar which persists in the areas 22. The step of quick cooling or quenching of the areas 20 after melting preserves this amorphous-like, disoriented state and thereby the low softening point temperature characteristic of such polymeric material. This hypothesis of actual melting accounts too for bead formation, inasmuch as the shrinkage induced by temperatures near the distortion temperature of Mylar film accompanied by the pull of the surface tension of the molten polymer should tend to cause a displacement of the melted material towards the relatively cool borders of the surrounding cooler material, thus forming a meniscular bead or grommet.

Whether or not my rationalization of the behavior of the product is correct, it is a fact that the mode of transmission of polarized light through the selected sealable areas is markedly different from what it is through the surrounding matrix material or through the original unprocessed Mylar film. Observations can be made by viewing, with suitable magnification, the sealable areas and surrounding non-sealable matrix by transmitted light which has been plane polarized by passage through a light polarizing sheet such as "Polaroid" film or through a Nicol prism. The polarized light which passes through the film containing sealable and non-sealable areas is then caused to pass through a second plane polarizing element similar to the first one employed. Rotation of one of the polarizing elements relative to the other will result, in the absence of a film between the polarizing elements, in a change in the intensity of the light transmitted to the eye by the system. The transmitted light will, as is well known, be minimal when the polarizing elements have their axes at 90° to each other. A petrographic microscope is well suited for this type of observation since it contains suitable polarizing elements as well as the optical magnification, needed for objects as minute as some of the forms of the sealable areas of this invention.

When Mylar film is so examined, there is no relative adjustment of the polarizing elements at which substantial amounts of light are not transmitted through such a film, and the film appears bright although there are observable differences in the brightness of such transmitted light depending on the exact relative angular relationship of the polarizing elements. Essentially the same observation is made when the field of view is restricted to the non-sealable matrix areas of the products of this invention. If attention is now shifted to the sealable areas of the product, these transmit, quite in contrast, very little light when the polarizing elements have their axes approximately at 90° one to the other; and appear blackened. This is equally true whether one looks at the beads 24 and 24a themselves (FIGS. 2 and 3) or the area 30 within the beads (FIG. 3). Accordingly, these observations support the proposition that the matrix areas remain in a state of crystallinity corresponding substantially to that of the original Mylar film and in the molecularly oriented state of the original Mylar film, whereas the beaded areas 20 have changed their state of crystallinity and have become amorphous-like and disoriented.

Figure 18:
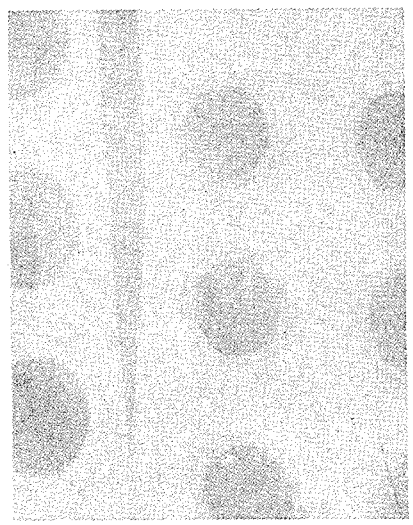

FIG. 18 is a photomicrograph showing at the left the appearance of ¼ mil perforated Mylar sheet as viewed through crossed Polaroid discs. The three vertical aligned dark areas represent the beaded areas including the perforations through the sheet and apparently appear darkened because of the changed state of crystallinity in these areas which has occurred as a result of passage through the apparatus. These darkened areas contrast with the brightness of the surrounding matrix 22 away from which heat was so rapidly conducted by the grid during the heat treatment that melting did not occur in these areas.

A further important property of the products of this invention, is that either before or after a sealing operation, the sheet may be conditioned in such a way that the material of the beaded areas regains a part or sometimes very nearly all of its original physical characteristics as evidenced by its melting point properties and reduced susceptibility to further sealing manipulation, without, however, significantly reducing the effectiveness of the seal already made. This result is achieved by a further thermal treatment of the product film. This thermal treatment step is one which requires a certain amount of time, the exact amount of which is a function of the temperature at which the thermal treatment takes place. For example, it takes approximately 300 seconds at 120° C. for the material of a treated bead in a film derived from ¼ mil Mylar film to regain a melting point of at least 240° C.; approximately 60 seconds at 150° C.; and approximately 20 seconds at 190° C. This thermal treatment may be imparted during a prolongation of a heat-sealing cycle, so that a heat-sealed laminate of one or more polyethylene terephthalate laminae may have throughout in that lamina or those laminae, more nearly the original properties of Mylar. These figures represent the results with normal dry heat. Alternatively, the same result may be achieved coincident with sterilization of the film and surface to which it may be adhered by subjecting the material to the usual steam sterilization cycle which takes place at temperatures up to about 120° C. for a period of several hours.

The right-hand sheet shown in the photomicrograph of FIG. 18 is identical with the sheet shown in the left of the photomicrograph except that the sheet has been subjected to a further heat treatment consisting of placing the sheet for ten minutes in a hot air oven having a temperature of 190° C. As hereinbefore explained, a certain portion of the beaded areas has, as a result of this additional heat treatment changed its appearance under the crossed Polaroid discs. In this portion of FIG. 18, the dark areas are commensurate with the perforations and the surrounding bordering areas are only slightly darker than the matrix areas, thus indicating that the additional heat treatment has again changed the physical characteristics of the beaded area material, a condition which is further evidenced by the fact that the sheet material on the right of the photomicrograph of FIG. 18 is no longer heat sealable at temperatures which will heat seal the material on the left. Tests further indicate that, whereas the entire darkened beaded areas of the left-hand sheet can be dissolved by methylene chloride, a similar solvent treatment of the right-hand sheet has no appreciable affect.

Operation of the apparatus shown in FIG. 4 may be varied according to the particular type of film desired. In general the temperature of the hot air jet should be such as to at least insure melting of certain areas of the film during its passage through the air jet. The velocity of the jet should be taken into consideration in connection with the speed of the film and the temperature of the jet, the faster the jet velocity the less the temperature for a given speed of film operation. In the formation of sheets of this invention, air jet temperatures running all the way from 260° to 875° C. have been utilized, and film speeds running from 4 to 33 yards per minute. The grid sizes in the case of circular holes have run all the way from 20 mils to ¼ of an inch in diameter. Obviously, the range can be extended, particularly downwardly.

With respect to the relative tensile strength of ¼ mil Mylar film before and after treatment in the apparatus with a grid having 20 mil holes occuring approximately 700 per square inch, the loss in tensile strength of the Mylar film is only about 18%. However, the stretch of such a film as measured on an Instron Tensile Testing Instrument, increases from 100%, in the case of the plain Mylar, to 130%; and, surprisingly enough, in ¼ mil Mylar film, it does so irrespective of whether the film has been treated on grids having 20 or 40 mil perforations. The loss in tensile strength is, for many purposes, further offset by the markedly improved tear resistance. As tested on an Elmendorf Tearing Tester (8 thicknesses) tear resistance increases from 6 grams on the original ¼ mil Mylar film to 24 grams in the machine direction of the original sheet and increases from 8 grams to 24 grams in the transverse direction. It will thus be seen that the perforated material has increased utility in a variety of uses where tear resistance is of importance, for example, where sewing, pinning, stapling, or any other operation involving further piercing of the film is performed during its fabrication into composite articles.

While the Mylar sheet of FIG. 1 (or FIG. 3) having differential surface areas may be prepared for distribution as a heat-sealable commodity, it should also be understood that the heat sealing of the sheet to itself or to other material may take place simultaneously with the heat treatment of FIG. 4. Thus, if the localized heat treatment is conducted while one surface of the sheet is in contact with other materials, not deleteriously affected by the localized heat treatment, the resulting product will be a heated-sealed lamination of the Mylar to the other material. This type of operation is particularly acceptable in packaging operations wherein it is desired to heat-seal two layers of Mylar to one another as in the manufacture of heat-sealed packages. If desired, here again the heat-seal thermal application may be prolonged to reconvert the beaded areas. The exposed surface will then no longer be readily heat-sealable.

Sheet material as herein used is intended to include other sheet materials besides films, such as polyethylene terephthalate fibers organized into sheet-like materials as by weaving, knitting, molding, carding, by paper-making methods, or otherwise.

It is also understood that, process-wise, products of this inventtion may be produced by a series of operations wherein certain selected areas are treated to produce sealability in a first operation and intervening or other areas are similarly subsequently treated in a separate operation to impart further sealable areas.

As can be seen, then, the invention is applicable to any kind of polymeric material whose melting point is thermally variable so that precise localized treatment of certain areas of the sheet may change the molecular structure to a state characterized by different surface softening point temperatures.

I claim:

1. A package comprising contents disposed between a flexible fibrous sheet and an opposed flexible perforated sheet of polyethylene terephthalate film, said sheets being heat-sealed directly together in immediate contact in spaced areas bordering said contents to form a closed package, portions of unsealed surface areas of said film being crystalline and portions of said fibrous sheet surrounded by sealed areas spanning and being visible through the perforations in said film.

2. A package comprising contents disposed between two flexible sheets having opposing surface portions, one of said sheets having a multiplicity of spaced perforations and composed of polyethylene terephthalate, said perforations having integral perimetric amorphous areas surrounding and forming the walls of said perforations, said sheets being heat-sealed directly together in immediate contact by fusion of said integral areas surrounding at least some of said perforations to form an enclosure for said contents, portions of unsealed surface areas of said polyethylene terephthalate sheet between said integral areas being crystalline, at least some of said perforations being opposed by surface portions of the other sheet.

3. The package of claim 2 in which one of the flexible sheets is fibrous.

References Cited in the file of this patent

UNITED STATES PATENTS

| | | |
|---|---|---|
| 829,652 | Johnson | Aug. 28, 1906 |
| 1,075,210 | Heyl et al. | Oct. 7, 1913 |
| 2,003,494 | Reynolds | June 4, 1935 |
| 2,004,041 | Driver | June 4, 1935 |
| 2,149,713 | Webber | Mar. 7, 1939 |
| 2,248,233 | Heritage | July 8, 1941 |
| 2,545,243 | Rumsey | Mar. 13, 1951 |
| 2,622,053 | Clowe et al. | Dec. 16, 1952 |
| 2,650,213 | Hofrichter | Aug. 25, 1953 |
| 2,719,100 | Banigan | Sept. 27, 1955 |
| 2,729,585 | Gruber et al. | Jan. 3, 1956 |
| 2,746,898 | Buckwalter et al. | May 22, 1956 |
| 2,795,820 | Grow et al. | June 18, 1957 |
| 2,801,446 | Wolinski | Aug. 6, 1957 |